Jan. 25, 1966 P. R. J. COURT 3,231,818

AUDIO SECRECY SYSTEM FOR SUBSCRIPTION TELEVISION

Filed Nov. 9, 1961 3 Sheets-Sheet 1

PATRICK R. J. COURT
INVENTOR.

BY Lyon & Lyon
ATTORNEYS

Jan. 25, 1966 P. R. J. COURT 3,231,818

AUDIO SECRECY SYSTEM FOR SUBSCRIPTION TELEVISION

Filed Nov. 9, 1961 3 Sheets-Sheet 2

PATRICK R.J. COURT
INVENTOR.

BY Lyon & Lyon
ATTORNEYS

PATRICK R.J. COURT
INVENTOR.

BY Lyon & Lyon
ATTORNEYS

United States Patent Office 3,231,818
Patented Jan. 25, 1966

3,231,818

AUDIO SECRECY SYSTEM FOR SUBSCRIPTION TELEVISION

Patrick R. J. Court, Los Angeles, Calif., assignor to Paramount Pictures Corporation, New York, N.Y., a corporation of New York Filed Nov. 9, 1961, Ser. No. 151,310
9 Claims. (Cl. 325—33)

This invention relates to subscription-television systems and, more particularly, to audio secrecy systems for subscription-television systems.

A subscription-television system has been described wherein two audio channels are transmitted along with the video signals to a subscriber receiver. One of these audio channels is employed for transmitting the program sound, or the sound which accompanies the television picture, and the other of these channels is employed for transmitting audio, known as "barker" sound. This barker sound provides information with respect to a program, the price to be charged therefor, as well as information with respect to future programs. One arrangement for transmitting both audio channels in a subscription-television system comprises sending the barker-audio signals frequency-modulated on the usual audio carrier and sending the program-audio signals frequency-modulated on another carrier which is located one megacycle below the picture carrier. A subscriber receiver can receive and reproduce the barker audio in the usual manner in which audio signals are reproduced by a television receiver. It is not until after payment is made for viewing a program that circuitry, provided in an attachment for the receiver, is operated to replace the frequency-modulated barker carrier with the frequency-modulated program carrier, whereby the receiver can reproduce the program-audio signals in place of the barker signals.

In the arrangement described briefly, reliance for security of program-audio signals as far as an unpaid subscriber or a non-subscriber is concerned, is based upon the fact that the program-audio carrier is transmitted within the 6 mc. channel at a location which is 5.5 mc. away from the usual program-audio carrier location. As far as present-day commercial television receivers are concerned, this program-audio-security system is effective. There is, however, a weakness in this method of hiding the audio in that if a frequency-modulation receiver is employed which covers the television band, or if a converter is employed with a frequency-modulation receiver to enable it to receive signals within the television band of frequencies, the program audio can be received just like any other FM signal, and the program audio can then be reproduced.

Accordingly, an object of this invention is the provision of a system for rendering program audio secure in a subscription-television system.

Another object of this invention is an arrangement for hiding the program audio in a television transmission in a manner so that unauthorized receivers will not be able to reproduce these signals, except with great difficulty and expense.

Yet another object of the present invention is the provision of a novel, useful, and unique arrangement for concealing audio-frequency signals which are transmitted in a subscription-television system from unauthorized listeners.

These and other objects of this invention are achieved in a subscription-television system wherein program-audio signals are transmitted, frequency-modulated on a carrier, and barker-audio signals are transmitted, also frequency-modulated on a carrier. In addition, the barker-audio signals are frequency-modulated on the already frequency-modulated program-audio carrier. At a subscriber receiver, there is provided apparatus whereby the doubly frequency-modulated carrier is received, and upon proper authorization, the barker audio is removed from the program-audio-modulated signals, which are thereafter processed in a manner so that the subscriber's receiver can reproduce the program audio. However, the unauthorized subscriber or nonsubscriber cannot remove the barker audio which is frequency modulated upon the program-modulated carrier, and thus his receiver will reproduce unintelligible noise.

The novel features that are considered characteristic of this invention are set forth with particularly in the appended claims. The invention itself, both as to its organization and method of operation, as well as additional objects and advantages thereof, will best be understood from the following description when read in connection with the accompanying drawings, in which:

Figure 1:
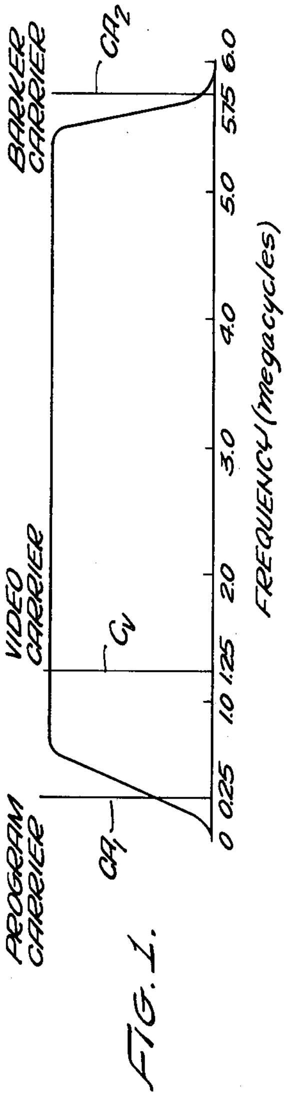
FIGURE 1 is a frequency-placement diagram, showing the location of the carriers in a subscription-television system in accordance with this invention.

Referring now to FIGURE 1, there may be seen a diagram, illustrating the disposition of the various carrier signals required in a subscription-televison system in accordance with this invention. The diagram illustrates a six-megacycle bandwidth, which in accordance with the rules and regulations of the Federal Communications Commission of the United States, is all that is allocated for each television. The video carrier, designated by the symbol $C_v$, is centered at 1.25 mc./s. within the six-megacycle band. The program-audio carrier, designated by $CA_1$, is centered at 0.25 mc./s. within the band. The barker-audio carrier, designated at $CA_2$, is centered at 5.75 mc./s. The video signal is amplitude-modulated on the video carrier $C_v$. The barker-audio signal is used to frequency modulate its carrier $CA_2 \pm 25$ kc./s. The program audio is used to frequency modulate its carrier $CA_1 \pm 25$ kc./s. In accordance with this invention, barker audio is also employed to frequency modulate $\pm 25$ kc./s. the program carrier $CA_1$, identically in both direction and magnitude with the frequency modulation of $CA_2$.

The amplitude levels of the carriers $CA_1$ and $CA_2$ with respect to the level of the carrier $C_V$ are maintained as is required in normal television broadcasting. Also, it should be noted that the location of the program-audio carrier relative to the video carrier is shifted, the barker-audio carrier being located where the program-audio carrier normally is positioned.

Figure 2:
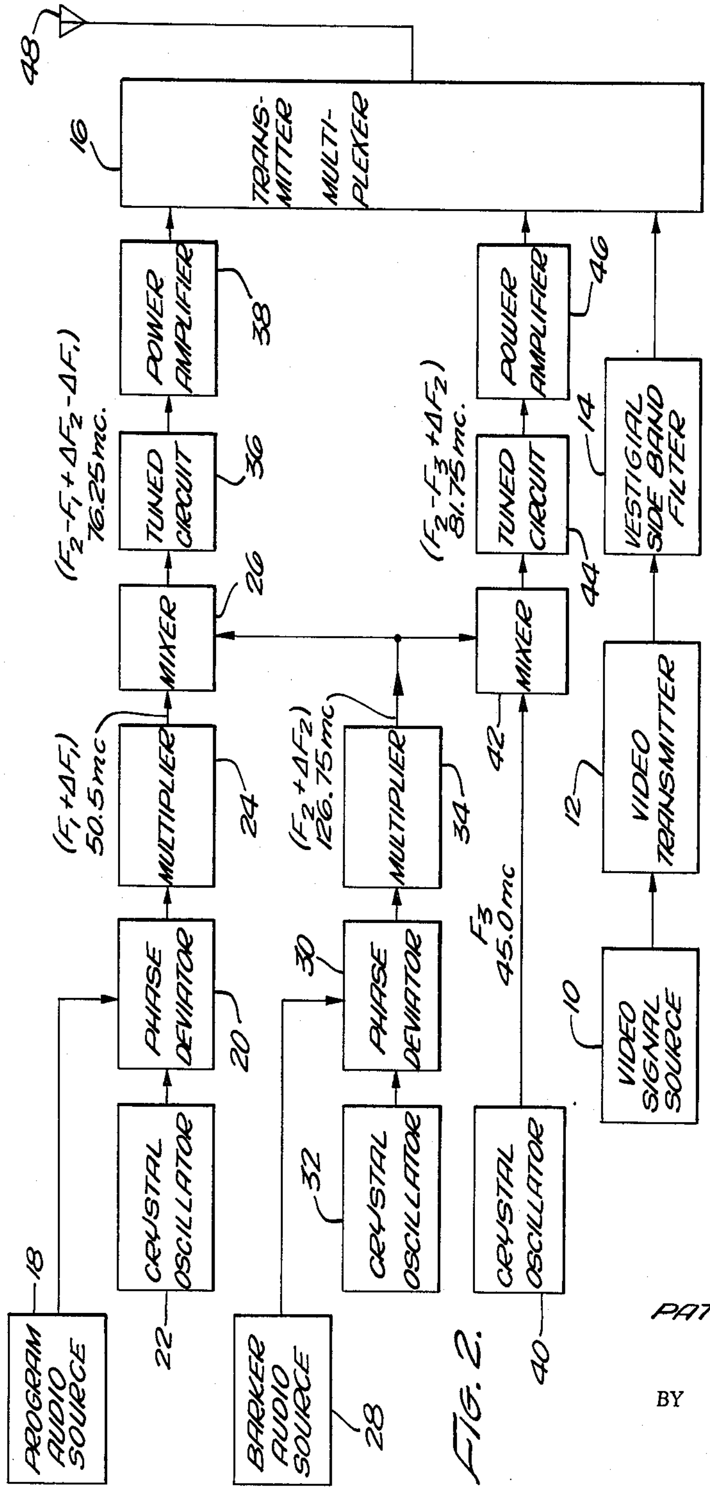
FIGURE 2 is a block diagram of an arrangement at a transmitter in accordance with this invention.

FIGURE 2 is a block diagram of an arrangement at the transmitter for carrying out the frequency modulation of the program-audio carrier by both program audio and barker audio and of the barker-audio carrier by barker audio in a manner so that an authorized receiver may easily remove the barker-audio modulation, leaving the program-audio carrier frequency-modulated by the program audio, which can be handled in the normal manner by a subscriber receiver. The transmitter will include the usual video-signal source 10, the output of which is applied to a video transmitter 12, which serves the function of modulating the video signals on a carrier. The output of the video transmitter 12 is applied to a vestigial sideband filter 14, which removes most of the lower sidebands of the carrier. The output of the vestigial sideband filter is applied to a multiplexer 16 for combining this signal with those of the frequency-modulated audio carriers prior to transmission.

A source of program-audio signals 18 has its output applied to a phase deviator 20, which deviates the phase of the oscillations received from a suitable crystal oscillator 22 in response to the audio signals. The output of the phase deviator 20 is then applied to a multiplier 24 for frequency multiplication up to the desired frequency-modulated carrier frequency. Assume, for the purposes of illustration, but not by way of limitation, that this frequency modulated frequency is 50.5 mc., deviated ±25 kc./s. For generalization purposes, assume that the output of the multiplier comprises a frequency $F_1+\Delta F_1$, where $F_1$ represents the program-audio carrier and $\Delta F_1$ represents the frequency modulations thereof. The output of the multiplier 24 is applied to a mixer 26.

A source of barker-audio signals 28 is applied to a phase deviator 30, which deviates the phase of the output of the crystal oscillator 32 in response to the barker audio. The output of the phase deviator 30 is applied to a multiplier 34, which multiplies up this output to a frequency $F_2$, assumed by way of example to be 126.75 mc./s., deviated ±25 kc./s. Thus, the frequency-modulated barker-carrier $(F_2+\Delta F_2)$, which is the output of the multiplier 34, is applied to the input to the mixer 26 to provide an output comprising $F_2-F_1+\Delta F_2-\Delta F_1$, or the difference of the two carrier plus the difference of the two deviations. The output of the mixer 26 is applied to a tuned circuit 36. This circuit is tuned to 76.25 mc., which is the difference of the two carriers $(F_2-F_1)$. The output of the tuned circuit 36 is applied to a power amplifier 38, which amplifies the difference signals and applies them to the multiplexer 16.

A crystal oscillator 40 provides an output comprising an unmodulated frequency $F_3$, assumed by way of example as 45 mc./s. This frequency $F_3$ is applied to a mixer 42, having as its other input the frequency $F_2+\Delta F_2$, which is the output of the multiplier 34. Thus, the output signal of the mixer 42 comprises difference signals $F_2-F_3+\Delta F_2$. This is applied to a tuned circuit 44, which is tuned to the difference of $F_2-F_3$, or 81.75 mc./s. The output of the tuned circuit 44 is applied to a power amplifier 46 to be amplified and then applied to the multiplexer 16 for subsequent radiation by the antenna 48.

From the foregoing description, it will be seen that the transmitter will radiate signals including a barker carrier $CA_2$ $(F_2-F_3)$, which is frequency-modulated by barker-audio signals $(\Delta F_2)$, and a program-audio carrier $CA_1(F_2-F_1)$, which is frequency-modulated by program-audio signals $(-\Delta F_1)$ and barker-audio signals $(\Delta F_2)$. The circuits represented by the rectangles are well known in the television transmission art, and, therefore, further explanation of the circuit details is believed unnecessary.

Figures 3, 5:
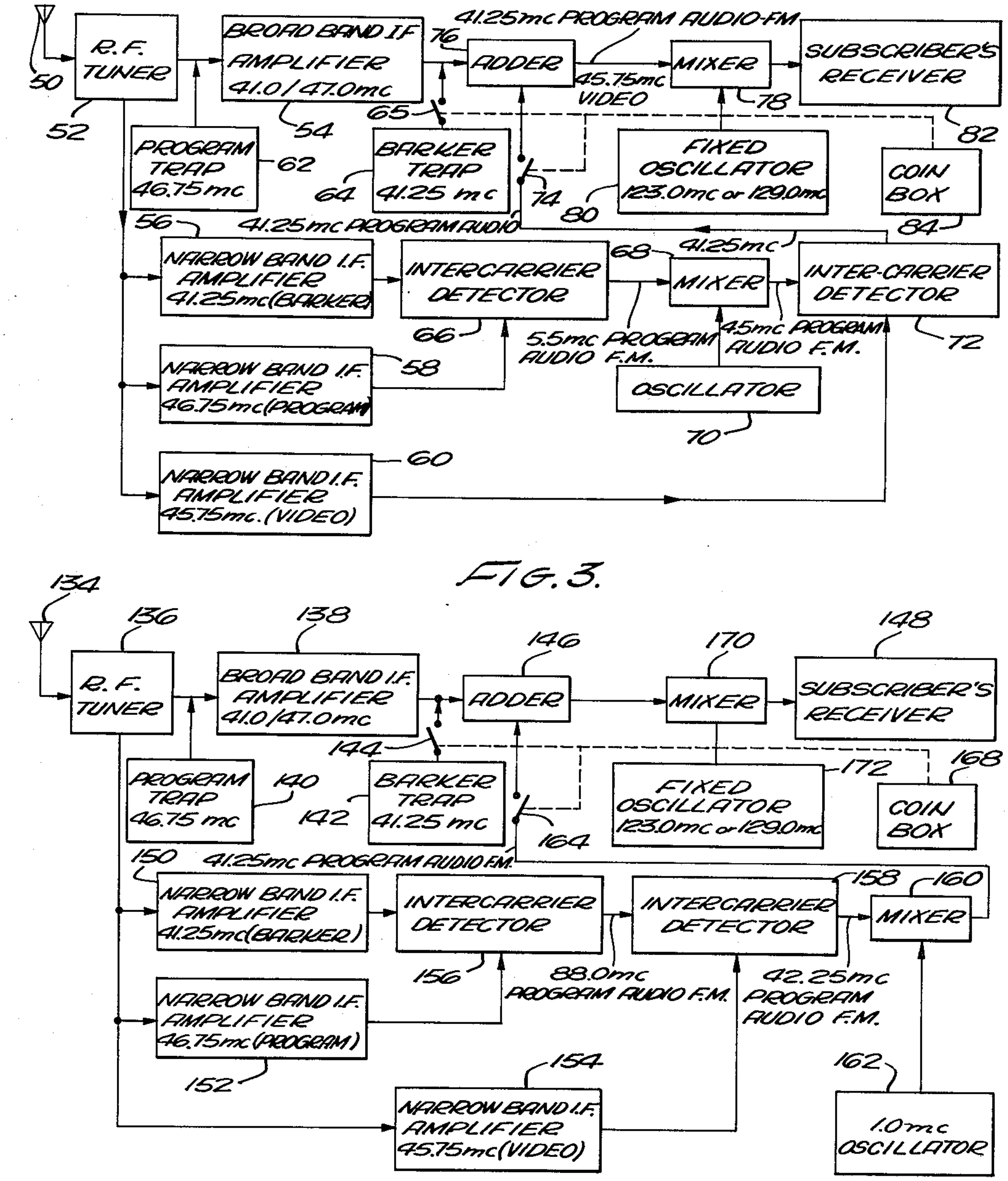
FIGURE 3 is a block diagram of an arrangement employed at a receiver in accordance with this invention.
FIGURE 5 is a block diagram of the circuits required at a receiver in accordance with this invention for properly processing the signals transmitted by the apparatus represented in FIGURE 4.

Referring now to FIGURE 3, there may be seen a block diagram which represents circuitry which is employed for enabling an authorized receiver to process the kinds of signals radiated by the transmitter represented in FIGURE 2. A receiving antenna 50 is connected to an RF tuner 52 for tuning in the program which is transmitted. The received signals are then converted to suitable intermediate-frequency signals in the RF tuner 52. By way of illustration, assume that the IF frequency for the video carrier is 45.75 mc., the IF frequency for the program-audio carrier is 46.75 mc., and the IF frequency for the barker carrier is 41.25 mc. The output of the RF tuner 52 is applied to a broad-band IF amplifier 54, which amplifies all signals between 41 and 47 mc./s. The output of the RF tuner 52 is also applied to a narrow-band IF amplifier 56, which amplifies signals centered at 41.25 mc., to a narrow-band IF amplifier 58, which amplifies signals centered at 46.75 mc., and to a narrow-band IF amplifier 60, which amplifies signals centered at 45.75 mc./s. It should also be noted that a trap 62 is connected to the input to the broad-band IF amplifier 54 for the purpose of attenuating program-audio IF signals. A second trap 64 may be connected to the output of the broad-band IF amplifier 54 when the switch 65 is closed for the purpose of attenuating any barker-audio IF signals.

The output from the two narrow-band IF amplifiers 56 and 58, which comprises the barker-audio IF and the program-audio IF, are applied to an intercarrier detector 66. This intercarrier detector comprises any nonlinear device such as a diode, wherein the two signals are mixed together. The difference frequency between the two signals is chosen as the output from the intercarrier detector. Because of the fact that the program-audio carrier has been frequency modulated with barker-audio signals $(\Delta F_2)$ identically in phase and amplitude as was the barker carrier by the barker-audio signals $(\Delta F_2)$, the barker-audio modulation will be cancelled, leaving a resultant difference signal of 46.75—41.25=5.5 mc./s., frequency modulated by the program audio $(-\Delta F_1)$. Arithmetically, this process may be written as follows:

$$F_2-F_1+\Delta F_2-\Delta F_1-(F_2-F_3+\Delta F_2)=F_2-F_1+F_2$$
$$-\Delta F_1-F_2+F_3-\Delta F_2=F_3-F_1-\Delta F_1$$

The 5.5 mc. difference frequency $(F_3-F_1)$, frequency modulated with program audio $(-\Delta F_1)$, is applied to a mixer circuit 68. The other input to the mixer circuit 68 consists of an unmodulated carrier which is obtained from a 1.0 mc./s. oscillator 70. The output of the mixer circuit is chosen as the difference frequency between 5.5 mc. and 1.0 mc., which is 4.5 mc. The program-audio modulation $(-\Delta F_1)$ is thus transposed from 5.5 mc. to 4.5 mc., and is applied to a second intercarrier detector 72. This second intercarrier detector also has applied to its input the output of the 45.75 mc. narrow-band IF amplifier 60. The amplifier 60 has a high gain, and its output, comprising the amplitude-modulator IF video carrier, is applied to the intercarrier detector 72 at a level which is much greater than the 4.5 mc. frequency-modulated carrier output from mixer 68. As is well known, in an intercarrier detector, the amplitude of the output signal is substantially independent of the amplitude of the larger of the two input signals, so the output of 70 consists of a frequency-modulated carrier with no significant amplitude modulation due to the video signals.

The output of intercarrier detector 72 comprises the difference frequency between 45.75 mc./s. and 4.5 mc./s., which is a carrier at 41.25 mc., frequency modulated with the program audio signals $(\Delta F_1)$. A switch 74, when closed, connects the output of the intercarrier detector 72 to an adder 76. The IF audio carrier, which has now been shifted to its proper position relative to the IF video carrier, is combined therewith in the adder 76. The output of the adder 76 is applied to another mixer 78, also having applied thereto the output of an oscillator 80. The oscillator 80 output comprises a frequency suitable for converting the two IF carriers to the frequencies of one of the allocated television channels. It may be, for example, 123 mc., if it is desired that the following subscriber-receiver 82 receive the subscription-television signals on channel 5, or may be a frequency of 129 mc., if it is decided that the subscriber-receiver 82 receive these signals on channel 6.

A coinbox 84 is provided. This coinbox is representative of any arrangement for insuring that a subscriber agrees to assume whatever financial obligation is desired, either by direct payment or by a recording against credit, for the price of the program being transmitted. This coinbox 84 maintains the switches 65, 74 in their open or nonoperated condition, so that the barker audio will be reproduced by the subscriber's receiver 82, since in this state it occupies the position that program audio in a nonsubscription-television broadcast occupies. Upon payment of the price demanded, the switches 65 and 74 are closed. The trap 64 attenuates the barker-audio IF signals, and therefore the program-audio carrier, which is now shifted to the location it should properly occupy for enabling reproduction by a subscriber receiver, is applied to the subscriber receiver and is reproduced thereby in place of the barker audio.

If reproduction of program audio is desired without substituting it in place of the barker audio, an output may be taken from the intercarrier detector 66 and applied to an independent 5.5 mc. IF circuit (not shown), followed by an FM discriminator (not shown), followed by an audio amplifier (not shown). Thus, this program-audio reproduction can be achieved outside of the subscriber-receiver by the utilization of known circuitry.

The output of the intercarrier detector is chosen as a difference frequency, which is 5.5 mc. This is a constant frequency spacing which is independent of the adjustment of the frequency of the oscillator in the tuner 52. Furthermore, despite any deviation of the RF tuner oscillator, the frequency spacing between the video IF frequency and the program-audio IF remains constant, and since the program-audio IF carrier is referenced to the video IF carrier, this insures that the proper and required intercarrier spacing of the video carrier and the audio carrier are achieved, regardless of any drift in the local oscillator frequency. This is important if normal commercially available television receivers are to be employed in this system for reproducing the program audio.

Nonsubscribers can only hear clearly the barker sound through their television receivers. Subscribers can hear either the program or the barker, as desired. Any unauthorized receivers hear both the barker and program sounds simultaneously, which is unintelligible.

While the invention as described above effectively disposes of the problem of simple stealing of the audio program, where the legitimate use of fairly conventional FM receivers is involved, it is conceivable that a fairly adept person can go to the further trouble of sacrificing a television receiver for the purpose of obtaining the program sound, even though he has not paid for this. This can be achieved by tuning the 4.5 mc. IF sound channel of the receiver to 5.5 mc. The program audio will then be reproduced by virtue of the cancellation of the barker FM in the video detector in just the same way that it cancels in the intercarrier detector 66. It seems quite improbable that this would be done, just to receive the program sound, particularly as the television receiver is thereby rendered useless for anything else. However, an embodiment of the invention to be described eliminates this expedient for obtaining program sound. In this embodiment of the invention, as previously, three carriers are transmitted having the same relative displacement as is shown in FIGURE 1. The barker audio is frequency-modulated on the barker carrier, as before. The program carrier is frequency-modulated ±25 kc./s. with program audio. This time it is also frequency-modulated ±25 kc./s. with barker audio; however, the deviation of the barker audio is exactly opposite in direction and magnitude to its deviation when modulated on the barker-audio carrier.

For the unauthorized individual with a simple FM receiver, or FM receiver and converter, the results obtained upon tuning to the program carrier would be an unintelligible superimposition of program and barker audio, and therefore it has no entertainment value. Any unauthorized individual who tunes the sound IF trap in his receiver to 5.5 mc. would also not receive any intelligible audio, since, in the intercarrier detector, the difference frequency is the one which is selected from the two input signals, and thus the deviation of the program carrier with the negative-barker modulation and the barker carrier with the positive barker modulation will add to a −50 kc./s. deviation.

In this case the program audio will have superimposed upon it barker information at twice the strength and probably very distorted. The resultant entertainment value is nil under these circumstances.

In order to yield the program audio free and clear of the covering modulations, the sum of the two carriers must be taken, which yields an intercarrier frequency (using standard IF frequencies) of 41.25 mc./s. plus 46.75 mc./s., which equals a total of 88.00 mc./s. Clearly, the intercarrier sound IF frequency of 4.5 mc. is so different from 88 mc. that simple detuning of a normal receiver is impossible, and considerable skill is required to replace the normal circuitry with new circuitry to render the program audible. Total equipment security is therefore considerably increased.

Figure 4:
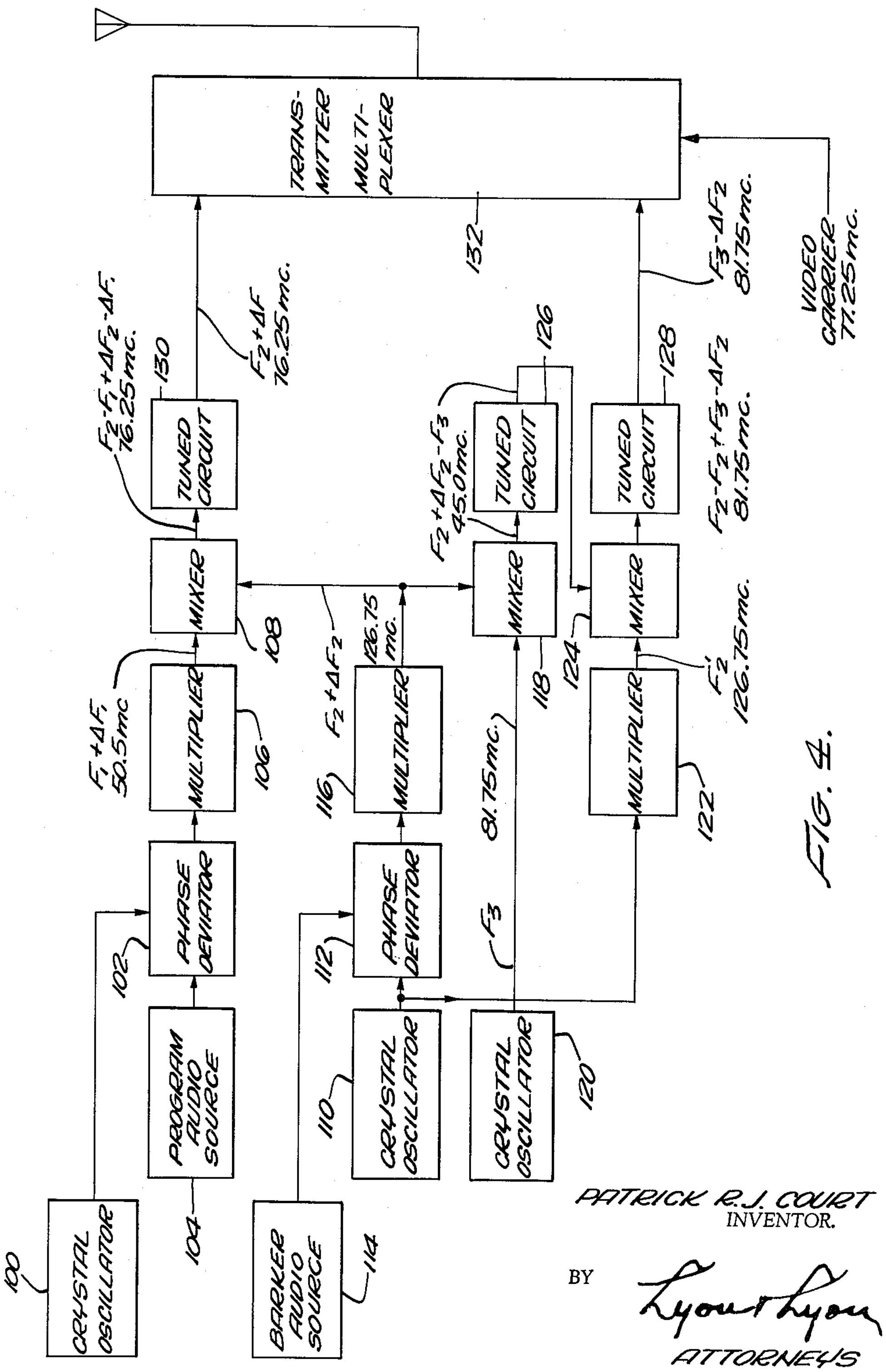
FIGURE 4 is a block diagram of another arrangement at a transmitter in accordance with this invention.

Reference is now made to FIGURE 4 of the drawings, which is a block diagram of the apparatus required at the transmitter in order to effectuate a hiding of the program audio from unauthorized receivers, in accordance with this invention. The video portion of the transmitter may be the same as was described previously, or it may include any suitable arrangement for rendering the video portion of the program unintelligible to unauthorized receivers. A crystal oscillator 100 applies an unmodulated output to a phase deviator 102, which operates to phase-modulate these oscillations in response to the output from a program-audio source 104. The output of the deviator 102 is applied to a frequency multiplier 106, which multiplies up its input to a frequency which, if unmodulated, would be $F_1$, but since it is modulated, the output of the multiplier 106 is $F_1+\Delta F_1$. For further clarity in the illustration, assume that the multiplier-output unmodulated frequency is 50.5 mc./s., which is modulated +25 kc./s. by the program audio.

The output of the multiplier 106 is applied as one input to a mixer 108. The second input to the mixer is barker-audio modulated on a carrier. This is derived in a circuit arrangement comprising a crystal oscillator 110, applying its output to a phase deviator 112, which receives as the modulation control input the output of the barker-audio source 114. The output of the phase deviator 112 is multiplied by a multiplier circuit 116 to a frequency $F_2+\Delta F_2$, which, by way of numerical example, can be 126.75 mc. The output of the multiplier 116 is applied to the mixer 108 and also to another mixer 118, wherein the output of an oscillator 120 is applied so that the mixer 118 output is the difference of its two inputs, just as the output of the mixer 108 is the difference of its two inputs.

The oscillator 120 provides an output designated as $F_3$, assumed as 81.75 mc./s. Thus, the output of the mixer 118 is $F_2+\Delta F_2-F_3$, which is a frequency of 126.75−81.75=45 mc./s., with the $\Delta F_2$ barker deviation thereon, the polarity of which may be considered as instantaneously positive. The output of the mixer 108 is a frequency $F_2-F_1+\Delta F_2-\Delta F_1$, or a frequency of 126.75−50.5=76.25 mc., which has instantaneously negative program-audio frequency modulation and instantaneously positive barker-audio frequency modulation thereon. The output of the crystal oscillator 110 is applied to a multiplier 122, with multiplication identical to that of multiplier 116, to be multiplied up to a frequency $F_2'$, which, as previously indicated, is 126.75 mc/s. $F_2'$ is a steady frequency—however, with no frequency modulation. This is applied to a mixer 124, which has as its second input the output of a tuned circuit 126. The tuned circuit is connected to the output of the mixer 118 and selects the 45 mc. output thereof, which is modulated by the barker sound. The output of the mixer 124 is chosen as the difference of its inputs, providing a resultant frequency of 126.75−45.0=81.75 mc. Arithmetically, the process in mixer 124 may be written $$F_2'-(F_2+\Delta F_2-F_3)=F_2'-F_2-\Delta F_2+F_3=F_3-\Delta F_2$$

Thus, $F_3$ is frequency modulated with barker audio, with a polarity instantaneously negative, and is at the frequency of the normal audio carrier of channel 5 ($CA_2$ in FIGURE 1).

$F_2$ is frequency modulated with barker audio, with a polarity instantaneously positive and with program audio instantaneously negative, and is at the frequency of the program-audio carrier of channel 5 ($CA_1$ in FIGURE 1).

The output of mixer 124 is selected by the tuned circuit 128, tuned to 81.75 mc./s., while the output of mixer 108 is selected by a tuned circuit 130, tuned to 76.25 mc./s. The output of the tuned circuits 128 and 130 are applied to the multiplexer 132, to be combined with the video carrier at 77.25 mc./s. ($C_v$) and thereafter radiated to a receiver.

Reference is now made to FIGURE 5, which is a block diagram of the apparatus required at a receiver in order to render the unintelligible program audio intelligible to an authorized subscriber. This apparatus includes the receiving antenna 134, which is connected to an RF tuner 136, which serves the function of tuning the antenna to the transmitted signals and then converting them to a suitable intermediate frequency. For the purposes of rendering this description clear, it will be assumed that the video IF frequency is 45.75 mc., the program-audio IF frequency is 46.75 mc., and the barker-audio IF frequency is 41.25 mc. These are the same values as were shown in connection with the description of FIGURE 3. The output of the RF tuner, comprising the three IF frequencies, is applied to a broad-band IF amplifier 138, which amplifies all frequencies between 41 and 47 mc. At the input of this broad-band amplifier is a trap 140 for attenuating or effectively eliminating the program-audio IF frequency of 46.75 mc. from the input to the broad-band IF amplifiers. At the output of the broad-band amplifier, there is another trap 142, which, when switch 144 is operated, is connected to this output. The trap 142 serves to effectively attenuate and remove the barker IF of 41.25 mc. from the broad-band IF output. Thus, the output of the broad-band IF amplifier 138, when switch 144 is operated, only comprises the video IF, which is amplitude-modulated by the video signal. This is applied to the adder 146. When the switch 144 is open, then the output of the broad-band IF comprises the video IF and the barker IF. These are transmitted by the apparatus to be described to the input to a subscriber receiver 148, which can process these signals in the customary manner.

The output of the RF tuner is also applied to three narrow-band IF amplifiers, respectively an IF amplifier 150, which selects and amplifies the barker intermediate frequency of 41.25 mc.; a narrow-band IF amplifier 152, which selects and amplifies the program-audio intermediate frequency of 46.75 mc.; and a narrow-band IF amplifier 154, which selects and amplifies the video-carrier intermediate frequency. The outputs of the narrow-band IF amplifiers 150 and 152 are applied to the intercarrier detector 156, which adds these two intermediate frequencies. This results in a cancellation of the frequency modulation due to the barker-audio signals, since it will be previously recalled that this modulation on the barker carrier could be represented by $-\Delta F_2$ and on the program-audio carrier could be represented by $+\Delta F_2$. In other words, cancellation of the barker information is due to the addition of two equal and opposite modulations, occuring simultaneously on both carriers.

The output of the intercarrier detector is the sum of the two input carriers, frequency-modulated only by the program audio ($-\Delta F_1$). This is a frequency of 88.0 mc., modulated +25 kc./s. The output of the intercarrier detector 156 is applied to a second intercarrier detector 158, having as its other input the output of the IF amplifier 154. The gain of the IF amplifier 154 is sufficiently high that the video IF carrier is applied to the intercarrier detector 158 at a level much greater than the frequency-modulated output signal from intercarrier detector 156, so that the intercarrier signal output from detector 158 is substantially devoid of video modulation. The output of the intercarrier detector 158 comprises a difference of its two inputs, which effectively is a 42.25 mc. carrier, modulated +25 kc./s. by program audio.

The output of the second intercarrier detector 158 is applied to the input of a mixer 160. The second input to this mixer comprises a 1.0 mc. unmodulated carrier output from an oscillator 162. The output of the mixer 160 comprises a carrier of 41.25 mc., frequency-modulated by the program audio, which is the difference frequency of the two inputs. This may be applied through a switch 164, when it is closed, to the input to the adder 146.

The switches 144 and 164 are operated in response to an output from a coinbox 168. This coinbox is of the same type as was described in connection with FIGURE 3 and comprises any suitable arrangement for obtaining payment from a subscriber for a program. When such payment is obtained, switches 144 and 164 are closed, whereby the input to the adder comprises the amplitude-modulated video IF and the frequency-modulated program IF. The output of the adder 146 is applied to a mixer 170, which has as its other input the output from an oscillator 172. The purpose of the mixer 170 is to convert the frequencies of the video IF carrier and program IF carrier (or the barker IF carrier, before payment for the program) to frequencies suitable for the subscriber receiver 148 to process in the manner of the normal television signals.

Since, as indicated by this arrangement, the output of the intercarrier detector 156 is the sum of the barker- and program-audio carriers which equals 88 mc., clearly, this is so different from the frequency to which a television sound IF can be simply detuned that this method of obtaining the program sound is impractical. In the absence of actually building the arrangement shown, the program sound is effectively intelligible to an unauthorized receiver.

It is within the scope of this invention to employ these two alternative arrangements for rendering the program audio intelligible in a cryptographic system wherein the polarity of deviation of the barker may be changed in some random manner, with complementary switching provided at the receiver in order that an authorized receiver can render the program audio intelligible. It should be further appreciated that, instead of using barker audio, it is within the scope of this invention to transmit just a plain noise signal, which masks the program audio completely to unauthorized or unpaid receivers.

A noteworthy feature of the receiver attachments which have been described is the use of the video IF carrier as a local oscillator. Since, in accordance with this invention, it is necessary to add to the video IF output from the broad band IF amplifier the translated program-audio IF, the correct intercarrier spacing of these two carriers must be maintained, regardless of the adjustment of the local oscillator in the RF tuner. Incorrect spacing between these carriers would result in adverse program-audio reproduction by the receiver. Since the same local oscillator is used in the RF tuner to convert both the video and audio carriers to intermediate frequencies, both have the same error frequency due to drift or mistuning of the tuner oscillator. By deriving the video carrier IF and using this as the local oscillator for the second intercarrier detector, the error frequency of the video IF is transferred to the translated program IF, and so the proper intercarrier IF spacing is preserved, regardless of the adjustment of the tuner. Any problems in reproduction of the program audio from this cause are thereby eliminated.

There has accordingly been described and shown herein a novel, useful, and simple arrangement for rendering audio signals intelligible to an unauthorized receiver.

I claim:

1. A subscription-television system comprising a transmitter and a receiver, said transmitter having a first and second signal source, means for generating first, second, and third carrier signals, means for frequency modulating signals from said first signal source on said first carrier to produce first frequency-deviated signals, means for frequency modulating signals from said second signal source on said second carrier to produce second frequency-deviated signals, means for combining said first and second frequency-deviated signals to produce a first resultant carrier frequency modulated by said signals from said first and second sources, means for combining said second frequency-deviated signals with said third carrier to produce a second resultant carrier frequency modulated by said signals from said second signal source, and means for transmitting said first and second resultant carriers; said receiver having means for receiving said first and second resultant carriers, means for combining said first and second resultant carriers to produce a third resultant carrier frequency modulated by said signals from said first signal source, and means at said receiver for selecting as output of said receiver either said third resultant carrier frequency modulated by said signals from said first signal source or said second resultant carrier frequency modulated by said signals from said second signal source.

2. A subscription-television system comprising a transmitter and a receiver, said transmitter having first and second signal sources, means for generating first, second, and third carrier signals, means for frequency modulating signals from said first signal source on said first carrier to produce first frequency-deviated signals, means for frequency modulating signals from said second signal source on said second carrier to produce second frequency-deviated signals, a first mixer circuit having two inputs, a second mixer circuit having two inputs, means for applying said first frequency-deviated signals to one of said first mixer inputs, means for applying said third carrier to one of said second mixer inputs, means for applying said second frequency-deviated signals to the other of said first and second mixer inputs to provide an output from said second mixer comprising a first resultant carrier frequency modulated by said signals from said second signal source and an output from said first mixer comprising a second resultant carrier frequency modulated by said signals from said first and second sources, the frequency modulation by said signals from said second signal source being equal in direction and amount as the frequency modulation of said first carrier by said signals from said second signal source, and means for transmitting said first and second resultant frequency-modulated carriers; said receiver having means for receiving said first and second resultant frequency-modulated carriers, means for combining said first and second resultant frequency-modulated carriers to produce a third resultant carrier frequency modulated by said signals from said first signal source, and means at said receiver for selecting as output of said receiver either said third resultant carrier frequency modulated by said signals from said first signal source or said second resultant carrier frequency modulated by said signals from said second signal source.

3. A subscription-television system comprising a transmitter and a receiver, said transmitter having a first signal source, a second signal source, means for generating first, second, and third carrier signals, means for frequency modulating signals from said first signal source on said first carrier to produce first frequency-deviated signals, means for frequency modulating signals from said second signal source on said second carrier to produce second frequency-deviated signals, a first mixer circuit having two inputs, a second mixer circuit having two inputs, means for applying said first frequency-deviated signals to one of said first mixer inputs, means for applying said third carrier to one of said second mixer inputs, means for applying said second frequency-deviated signals to the other of said first and second mixer inputs to provide an output from said second mixer comprising a first resultant carrier frequency modulated by said signals from said second signal source and an output from said first mixer comprising a second resultant carrier frequency modulated by signals from said first and second sources, the frequency modulation by said signals from said second signal source being equal in direction and amount of deviation as the frequency modulation of said first resultant carrier by said signals from said second signal source, a third mixer having two inputs, means for applying said second carrier signals to one of said third mixer two inputs and the output of said second mixer to the other of said third mixer two inputs to produce an output comprising a third resultant carrier which is frequency modulated by said signals from said second signal source with a frequency deviation opposite in direction but equal in amplitude to the frequency deviation of said first resultant carrier by said signals from said second signal source, and means for transmitting said frequency-modulated first and third resultant carriers; said receiver having means for receiving said frequency-modulated first and third resultant carriers, means for combining said first and third resultant frequency-modulated carriers to produce a fourth resultant carrier frequency modulated by said signals from said first signal source, and means for selecting as output for said receiver either said fourth resultant carrier frequency modulated by said signals from said first signal source or said third resultant carrier frequency modulated by said signals from said second signal source.

4. In a television system of the type wherein there are transmitted first and second frequency-modulated carriers, said first frequency-modulated carrier being frequency modulated by said first and second signals, said second frequency-modulated carrier being frequency modulated by said second signals, a receiver having means for receiving said frequency-modulated first and second carriers, means for combining said first carrier modulated by said first and second signals with said second carrier frequency modulated by said second signals to provide a resultant carrier frequency modulated by said first signals, means for selecting for output from said receiver either said resultant carrier frequency modulated by said first signals or said second carrier frequency modulated by said second signals, and means for attenuating said second signals frequency modulated on a second carrier when said resultant carrier frequency modulated by said first signals is selected.

5. In a television system of the type wherein there are transmitted first and second frequency-modulated carriers, said first frequency-modulated carrier being frequency modulated by first and second signals, said second frequency-modulated carrier being frequency modulated by said second signals equally in direction and magnitude to the frequency modulation of said first carrier by said second signals, a receiver having means for receiving said first and second frequency-modulated carriers, means for opposing said first and second frequency-modulated carriers to produce a first resultant carrier frequency modulated by said first signals, means for translating said first resultant carrier frequency modulated by said first signals to a second resultant carrier frequency modulated by said first signals, said second resultant carrier having substantially the same frequency as said second carrier frequency, means for selecting for output of said receiver either said second resultant frequency-modulated carrier or said second frequency-modulated carrier, and means for attenuating said second frequency-modulated carrier when it is not selected.

6. In a television system of the type wherein there are transmitted first and second frequency-modulated carriers, said first frequency-modulated carrier being frequency modulated by first and second signals, said second frequency-modulated carrier being frequency modulated by said second signals equally in magnitude but opposite in direction to the frequency modulation of said first carrier by said second signals, a receiver having means for receiving all said frequency-modulated carriers, means for adding said first and second frequency-modulated carriers to provide a resultant carrier frequency modulated by said first signals, means for translating said resultant carrier to another carrier frequency modulated by said first signals, said another carrier having the same frequency as said second carrier frequency, means for selecting for output of said receiver either said another carrier frequency modulated by said first signals or said second carrier frequency modulated by said second signals, and means for attenuating said second signals frequency modulated on said second carrier when it is not selected.

7. In a television system of the type wherein there are transmitted first and second frequency-modulated carriers, said first frequency-modulated carrier being frequency modulated by first and second signals, said second frequency-modulated carrier being frequency modulated by said second signals, equal in magnitude but in the same direction as the frequency modulation of said first carrier by said second signals, and a video carrier modulated by video signals, the frequency location of said second carrier relative to that of said video carrier being the same as that employed in commercial television-broadcast practice, a receiver for said system comprising means for receiving all said transmitted modulated carriers, means for translating said modulated first, second, and video carriers respectively to modulated first, second, and video intermediate-frequency carriers, means for opposing said frequency-modulated first and second intermediate-frequency carriers to produce a resultant carrier frequency modulated with said first signals, means for translating the frequency of said resultant carrier to that of said second intermediate-frequency carrier, a combining circuit having two inputs and an output, a first trap for attenuating said first intermediate-frequency carrier connected to one input of said combining circuit, a second trap for attenuating said second intermediate-frequency carrier, first normally open switch means for connecting when operated said first trap to said one input of said combining circuit, second normally open switch means for applying when operated the output of said means for translating to said combining circuit second input, means for applying said modulated first, second, and video intermediate frequencies to said one input of said combining circuit to provide an output comprising said modulated video intermediate frequency and said second intermediate frequency modulated by second signals, and means for operating said first and second normally open switch means for obtaining at the output of said combining circuit said modulated video intermediate frequency and the output of said means for translating.

8. In a television system of the type wherein there are transmitted first and second frequency-modulated carriers, said first carrier being frequency modulated by first and second signals, said second frequency-modulated carrier being frequency modulated by said second signals equal in magnitude but in the opposite direction as the frequency modulation of said first carrier by said second signals, and a video carrier modulated by video signals, the frequency location of said second carrier relative to that of said video carrier being the same as that employed in commercial television-broadcast practice, a receiver for said system comprising means for receiving all said transmitted modulated carriers, means for translating said modulated first, second, and video carriers respectively to modulated first, second and video intermediate-frequency carriers, means for adding said frequency-modulated first and second intermediate carriers to produce a resultant carrier frequency modulated with said first signals, means for translating the frequency of said resultant carrier to that of said second intermediate frequency carrier, a combining circuit having two inputs and an output, a first trap for attenuating said first intermediate-frequency carrier connected to one input of said combining circuit, a second trap for attenuating said second intermediate-frequency carrier, first normally open switch means for connecting when operated said second trap to said one input of said combining circuit, second normally open switch means for applying when operated the output of said means for translating to said combining circuit second input, means for applying said modulated first, second, and video intermediate frequencies to said one input of said combining circuit to provide an output comprising said modulated video intermediate frequency and said second intermediate frequency modulated by second audio signals, and means for operating said first and second normally open switch means for obtaining at the output of said combining circuit said modulated video intermediate frequency and the output of said means for translating.

9. In a television system of the type wherein there are transmitted first and second signals frequency modulated on a first carrier, said second signals being also frequency modulated on a second carrier, and video signals modulated on a third carrier, a receiver having means for receiving all said carriers, means for simultaneously converting said modulated first, second, and third carriers to respective first, second, and third modulated intermediate frequencies, first means for mixing said first and second modulated intermediate frequencies to obtain a resultant carrier frequency frequency modulated with said first signals, means for removing the modulation on said third intermediate frequency to obtain an unmodulated third intermediate frequency, second means for mixing said unmodulated third intermediate frequency as a local oscillator frequency, with said resultant carrier frequency to provide as output a frequency-modulated carrier frequency wherein said carrier frequency has the same frequency deviations as said third modulated intermediate frequency, means for adding output of said second means for mixing with said third modulated intermediate frequency, and means for utilizing the output of said means for adding.

References Cited by the Examiner

UNITED STATES PATENTS

| | | | |
|---|---|---|---|
| 2,414,101 | 1/1947 | Hogan | 178—5.1 |
| 2,418,119 | 4/1947 | Hansen | 325—34 |
| 2,582,968 | 1/1952 | Deloraine et al. | 325—34 X |
| 2,905,747 | 9/1959 | Kidd | 178—5.1 |

DAVID G. REDINBAUGH, *Primary Examiner.*

ROY LAKE, *Examiner.*